Jan. 19, 1965   R. WICK ETAL   3,165,988
INDICATOR ARRANGEMENTS
Filed July 24, 1961   5 Sheets-Sheet 4

INVENTORS
RICHARD WICK
KURT RAMSAUER
GÜNTHER ROOS
BY
Michael S. Striker
Attorney

United States Patent Office 3,165,988
Patented Jan. 19, 1965

3,165,988
INDICATOR ARRANGEMENTS
Richard Wick, Grunwald, near Munich, and Kurt Ramsauer and Günther Roos, Munich, Germany, assignors to Agfa Aktiengesellschaft, Leverkusen-Bayerwerk, Germany
Filed July 24, 1961, Ser. No. 126,821
Claims priority, application Germany, July 23, 1960, A 35,187/60; July 26, 1960, A 35,205/60
32 Claims. (Cl. 95—1.1)

The present invention relates to indicating devices and more particularly to indicating devices in cooperation with controls which are used to control one or more variables of a given machine such as a photographic device.

For example, the present invention is applicable to photographic reproduction devices. In such devices it is necessary to set controls so as to provide the best possible photographic reproductions. For example, when operating a machine which makes color reproductions it is often necessary to regulate the exposures made with the several basic colors so as to provide for necessary corrections in the degree of contrast of the negative, transparency, or the like from which the photographic reproduction is made. It may be that after a photographic reproduction is made additional identical reproductions will be required or the results are considered unsatisfactory so that a different change in the position of the controls is required. For this reason it is necessary to retain a record of the settings made on the controls of the machine so that when another reproduction is made one can either repeat these settings or change them so as to make a better reproduction. This recording of the settings is an extremely time consuming operation because at the present time it is necessary for an operator to indicate the settings by hand, as by writing down the settings on the back of the photograph itself, for example. Of course, this is but one specific area where the problem which is solved by the present invention occurs. It is also necessary, for example, to manually write down order numbers or other information in connection with various projects such as the making of photographic reproductions, and oftentimes in making photographs with cameras it is necessary for the operator to indicate the camera settings used when making a particular photograph so that it will be known when the photograph is finally obtained what the camera settings were. All of these operations at the present time are manually performed, so that there is a considerable disadvantage with respect to time as well as with respect to labor costs.

It is accordingly a primary object of the present invention to provide a structure which will indicate the values of the various variables such as the particular chosen values from among the several possible settings of a camera, photographic reproduction machine, or the like.

It is furthermore an extremely important object of the present invention to provide a structure which, when any machine is actuated by the operator to provide one or more of a plurality of selected operating values, will automatically actuate an indicating assembly which will automatically indicate the selections made by the operator, so that with the invention the entire indicating and, if desired, recording of the settings used for any particular operation takes place in a fully automatic manner requiring absolutely no time and effort on the part of the operator.

It is also an object of the present invention to provide a structure of the above type which is extremely compact so that it can be incorporated into devices such as photographic reproduction machines, cameras, and the like without requiring a large amount of space.

An additional object of the present invention is to provide a structure of the above type which is extremely simple and which operates very reliably.

It is an additional object of the present invention to provide a structure of the above type wherein several unitary assemblies which provide the several indicating symbols can be located so close to each other that the several symbols will be available in an extremely small amount of space making it possible to arrange a relatively large number of indicating symbols in an extremely small space.

It is also an object of the present invention to provide structures which will automatically start and stop the drives used to move the moving components so that these components are moved only when necessary and do not continuously run, for example.

It is also an object of the present invention to provide a structure capable of providing a printed indication of selections and which at the same time is automatically prevented from operating until a final selection has been made and indicated.

It is furthermore an object of the invention to provide an arrangement of the type discussed above which is particularly suitable for use in color photography and which also is useable for many other purposes, as will be apparent from the description which follows:

With the above objects in view the invention includes in a control and indicating assembly, a plurality of manually operable selecting means respectively corresponding to a plurality of variables and enabling the operator to select one of several values of each variable. A plurality of carriers respectively correspond to the plurality of selecting means and each carrier carries symbols corresponding to the possible selection of the values among the several variables. In accordance with the present invention a structure is provided to be automatically actuated when the operator makes a selection with the plurality of the manually operable selecting means, and this structure will automatically move the plurality of carrier means to positions where their symbols will respectively indicate the several selections made on the several manually operable selecting means.

The novel features which are considered as characteristic for the invention are set forth in particular in the appended claims. The invention itself, however, both as to its construction and its method of operation together with additional objects and advantages thereto, will be best understood from the following description of specific embodiments when read in connection with the accompanying drawings, in which:

Figure 1:
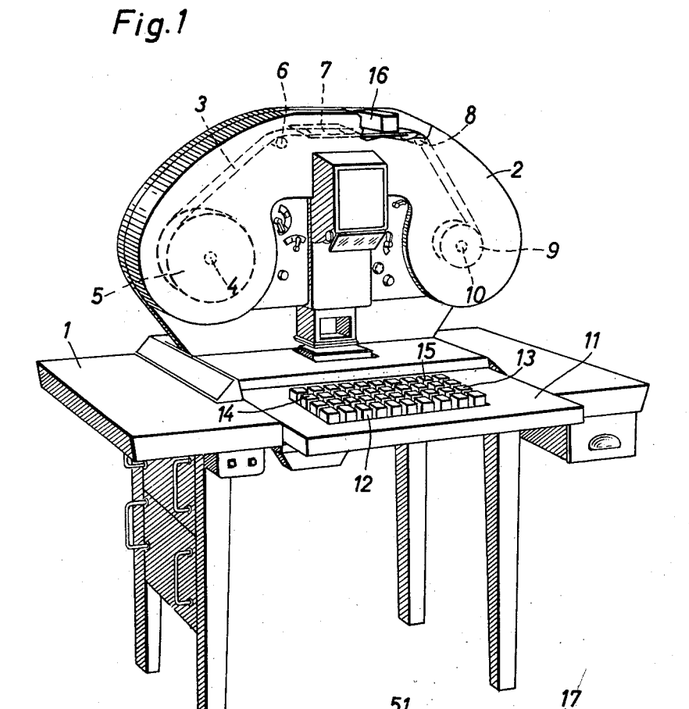
FIG. 1 is a perspective diagrammatic illustration of a control and indicating assembly according to the invention as incorporated into a machine for making photographic color reproductions.

Referring to FIG. 1, there is shown therein a machine for making photographic color reproductions, and this machine includes the work table 1 which carries a housing 2 in which is located the strip of photographic copy paper 3. This strip of photographic copy paper 3 is derived from a supply roll 5 carried by the support 4 on which the roll 5 is turnable during withdrawing of the strip 3 therefrom, and the strip 3 is guided for movement over a guide roll 6 to the exposure window 7 where the photographic copy paper is exposed. After exposure the photographic copy paper is guided over a guide roll 8 to the take-up roll 9 which is supported for turning movement by the support 10 within the housing 2. These features are indicated only diagrammatically since the details of the structure for moving the photographic copy paper 3 from its supply spool to its take-up spool in a step-wise fashion past the exposure window 7 so as to make the several photographic reproductions forms no part of the present invention.

The making of the color photographic reproductions may be carried out by the use of three basic colors such as the additive green, red and blue colors which may be respectively used to provide predetermined portions of the exposure, and these basic colors may be applied either simultaneously or in succession. Thus, the exposure is made with each of the basic colors, and the extent to which each basic color is used in any one exposure is determined by a well known and therefore unillustrated photoelectric control structure which automatically interrupts the exposure when a selected or predetermined amount of the particular color has been provided in the exposure. Thus, the photocells are set so that when a predetermined amount of the light of the given basic color has reached the photocell the exposure will automatically terminate. When an exposure is made simultaneously with the three colors, the photoelectric devices may have three control assemblies, respectively, and the photocells of these assemblies are respectively sensitive to the light of the several basic, additive colors. For example, the control in this case can be provided by three copy-lamps respectively providing the three additive colors and respectively connected operatively with exposure control devices by which these three lamps are extinguished automatically and independently of each other when the several photocells sense that the exposure to the particular basic color has reached the preselected degree. Such a device is shown in detail in the U.S. patent application Serial Number 16,756, of March 22, 1960.

According to the particular combination of colors used, during the process of making the photographic color reproduction the amount of light of the several basic colors reaching the copy paper or other copy material can be regulated so as to be greater than or less than a certain initial amount. There will thus be an initial setting, corresponding to the initial or basic amount of exposure to the particular basic color, and then a selecting means is available so that an adjustment can be made to increase or decrease the exposure of the particular color from its basic or initial amount. For this purpose a switchboard 11 is located at the table 1 shown in FIG. 1, and this switchboard 11 carries rows 12, 13, and 14 of manually operable keys, and these keys may be actuated by the operator to provide for a change in the sensitivity of the individual exposure control devices so that they will provide for an automatic termination of the exposure according to the particular key which has been depressed by the operator. The several keys of the row 12 serve to provide a stepwise influence on the exposure to red, while the several keys of the row 13 provide a selection for the degree of exposure to the color green, and the keys of the row 14 provide the operator with a selection of the degree of exposure of the color blue. In order to influence the degree of exposure to all of the colors so as to change the density of the entire copy, there is a fourth row 15 of keys which can be operated by the operator to simultaneously regulate the degree of exposure to all three basic colors. Thus, the several rows 12–15 provide several manually operable selecting means respectively corresponding to the variables which in the case are the amounts of light of the basic colors and available to the operator for making a selection of one of several values for each of the variables. In the illustrated example the keys of each of the rows 12–15 are numbered 1–9 and 0.

Between the exposure window 7 and the guide roll 8 there is located within the housing 2 along the path of movement of the strip 3 of copy paper a housing 16 in which is located the indicating structure of the invention, and this structure makes it possible in the illustrated example to provide automatically on the back of the photographic reproduction an indication of the selections made by the operator with the plurality of manually operable selecting means 12–15, so that in this way there will be recorded an indication of the adjustments made on the machine during the process which resulted in making of a particular photographic reproduction, and therefore the settings of the machine are known for each photograph and can be repeated or can be changed in order to provide corrections. With the present invention the indicating, as by stamping, on the back of the photograph of the settings made by the operator with the several keys takes place in a fully automatic manner.

Figures 2, 4, 5:
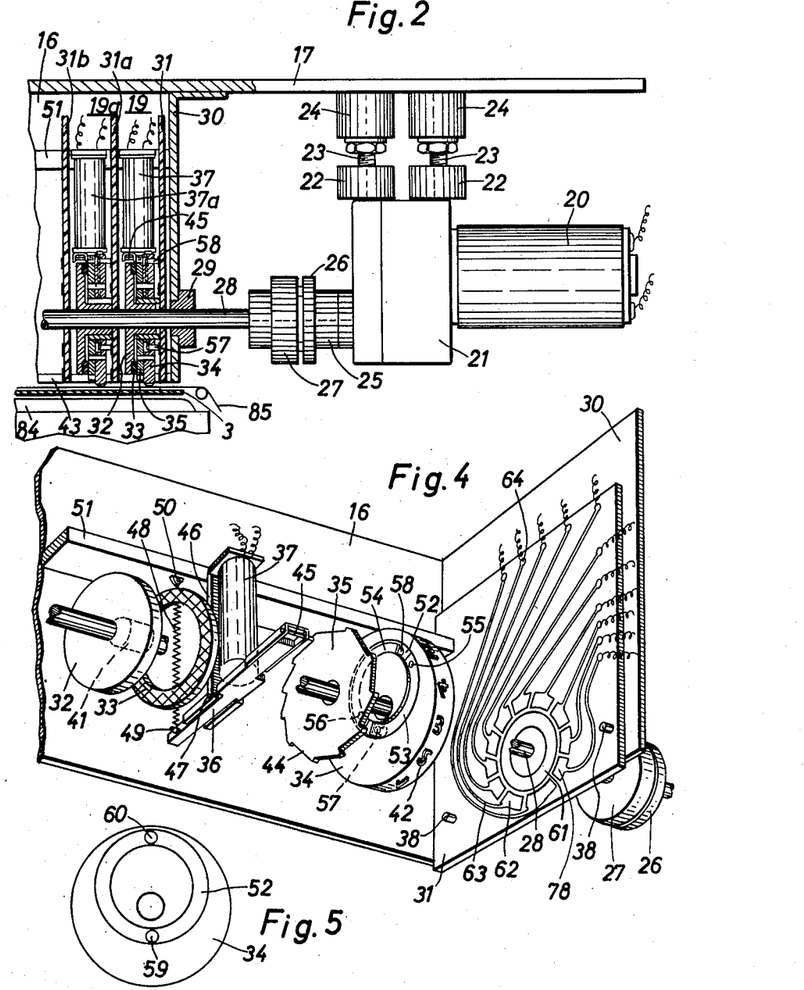
FIG. 2 is a fragmentary longitudinal section illustrating details of the structure of the invention.
FIG. 4 is a fragmentary perspective exploded view of the structure of one of the units shown in FIG. 2.
FIG. 5 is a side elevation of an indicating disc of the invention.
Figure 3:
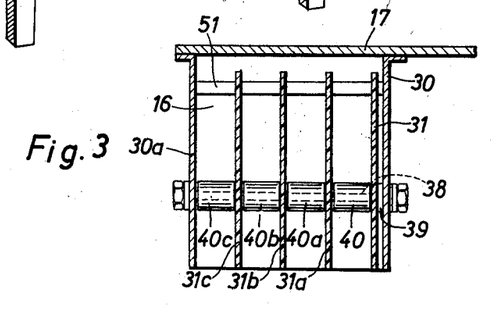
FIG. 3 is a transverse section showing the arrangement of several units of the invention.

The indicator structure of the invention is shown in greater detail in FIGS. 2–5. The housing 16 is carried by a plate 17 (FIG. 2) which serves to fix the indicator device to the inner surface of the housing 2 of the machine for providing photographic reproductions. The housing 16 is provided in its interior with four identical units respectively corresponding to the number of manually operable selecting means 12–15, and in FIG. 2 only two of the units 19 and 19a are illustrated, while in FIG. 4 only the unit 19 is shown in an exploded perspective illustration. In FIG. 3 the structural elements of the units themselves are omitted, but FIG. 3 shows how the four units are arranged in side by side relation in an extremely small space. As is described below, the several units which are located one next to the other in the housing 16 are respectively controlled by the rows of keys 12–15.

The indicating device includes a drive means formed by a direct current motor 20 which is carried by the housing 21 of a step-down transmission and which drives the step-down transmission. The housing 21 of the step-down transmission is fixed to the rubber blocks 22 which are in turn fixed to the screws 23 which are in turn fixed to the members 24 carried by the support plate 17. The shaft 25 which is driven from the motor 20 through the step-down transmission extends from the housing 21 and is connected to the shaft 28 by way of an elastic coupling structure 26, 27. Thus, a suitable yieldable medium is located between and interconnects the coupling members 26 and 27 which are respectively fixed to the shafts 25 and 28, and in this way the drive is transmitted from the motor 20 to the shaft 28 which extends through the sleeve 29 carried by the side wall 30 of the housing 16. This shaft 28 forms the drive shaft for the various units of the indicator structure of the invention and the shaft 28 extends through the sleeve 29 into the housing 16 through the several units therein for driving all of these units in a manner described below.

The unit 19 whose components are illustrated most clearly in FIG. 4 includes a plate 31 made of an electrically non-conductive material. In addition, the unit includes a friction-clutch means composed of the disc 32 which is fixed to the shaft 28 for rotation therewith and which carries a ring 33 of a suitable friction material such as cork, this ring 33 being fixed coaxially to the disc 32 for rotation therewith. A carrier is provided for carrying the several symbols 42 which correspond to the several keys of each of the manually operable selecting means, and this carrier takes the form, in the illustrated example, of a disc 34 through which the shaft 28 freely extends so that this disc 34 is freely turnable with respect to the shaft 28. It will be noted that, in contrast, the friction clutch means 32, 33 is fixed to the shaft 28 for rotation therewith. The symbols 42 are carried by the carrier disc 34 at its outer periphery. A stop means is provided for stopping the carrier 34 in an angular position where one of the symbols 42, which corresponds to a selected key, will be located in an indicating position, and this stop means includes the ratchet wheel 35 which is fixed to the disc 34 for rotation therewith, the pawl 36 which cooperates with the ratchet wheel 35, and the electromagnet 37 which controls the position of the pawl 36. The ratchet wheel 35 is provided with teeth 44 which respectively correspond to the several symbols 42. As is particularly apparent from FIGS. 3 and 4, the plates 31, 31a, 31b, and 31c of the several units are carried by a pair of stationary rods 38 extending between and carried by the sidewalls 30 and 30a of the housing 16, and sleeves 40, 40a, 40b, and 40c, as well as a sleeve 39 are carried by the rods 38 for providing between the plates 31, 31a, 31b, and 31c as well as between the latter plate and the plate 30a and between the plate 31 and the wall 30 the distances shown most clearly in FIG. 3. All of these plates, which is to say, the plates 31, 31a, 31b, 31c, as well as the walls 30, 30a are formed with aligned openings through which the shaft 28 extends so as to be freely turnable with respect to the stationary plates.

The ring 33 of cork or the like may be glued, for example, to the disc 32 which is fixed to the shaft 28, as described above. This disc 32 fixedly carries a sleeve 41 through which the shaft 28 passes, and the disc 34 is freely turnable on the sleeve 41, and of course the ratchet wheel 35 is fixed by any suitable screws or the like to the disc 34. Inasmuch as the symbols 42 correspond to the keys of each of the rows 12–15, the symbols will be the numerals 1–9 and 0. The diameter of the disc 34 is so great that only one of the symbols 42 is aligned in one position of the disc 34 with the bottom opening 43 at the lower part of the housing 16. As is particularly apparent from the lower left portion of FIG. 2, only one of the symbols can extend beyond the opening 43. The pawl 36 includes a rod 45 which cooperates with the teeth 44 of the ratchet wheel 35, and a support 46 is provided for carrying the electromagnet 37 as well as for carrying the pivot pin 47 on which the pawl 36 is pivoted. A spring means is provided to urge the pawl 36 to a position where its tooth or rod 45 engages the ratchet wheel 35, and this spring means takes the form of an elongated coil spring 48 connected at one end to a pin 49 which is fixed to the pawl 36 and at its opposite end to a lug 50 which is fixed to a bar 51 which is carried by the housing 16. This bar 51 also serves to support the bracket 46 which carries the electromagnet 37. The pawl 36 acts as the armature of the electromagnet 37, and when the electromagnet is energized the pawl 36 is turned in opposition to the spring 48 to a position where the rod 45 is located beyond the teeth of the ratchet wheel 35 so that when the electromagnet 37 is energized the pawl 36 is spaced from the ratchet wheel 35 to release the disc 34 for rotation, this disc 34 being rotated at this time by the friction clutch means 32, 33. Although the ring 33 actually engages the wheel 35, inasmuch as this wheel 35 is fixed to the disc 34, it is evident that the disc 34 will be driven from the shaft 28 through the friction clutch means whenever the electromagnet 37 is energized.

As is particularly evident from FIG. 5, each disc 34 is formed in its face which is directed toward the ratchet wheel 35 with a circular groove 52 whose center is spaced from the shaft 28, and in this groove are located a pair of electrically conductive leaf springs 53 and 54 which are electrically connected to each other. These leaf springs are of course also of an arcuate configuration so as to be received within the groove 52, and the configuration of the leaf springs 53 and 54 is particularly evident from FIG. 4. Screws 55 and 56 serve to fix the leaf springs 53 and 54 at one of their ends to the disc 34. The leaf springs 53 and 54 respectively carry the brushes 57 and 58 which are electrically conductive and made of carbon, for example, in the same way as brushes of an electric motor, and these brushes 57 and 58 are in the form of pins which extend parallel to the axis of the disc 34 through openings 59 and 60 which pass through the disc 34 and communicate with the groove 52 thereof which is particularly apparent from FIG. 5. These brushes 57 and 58 are of course in an electircally conductive relation with the leaf springs 53 and 54.

The springs 53 and 54 urge the brushes 57 and 58 into the engagement with the plates 31, and at the same time these leaf springs because of the reaction from the urging of the brushes against the plate 31 serve to urge the disc 34 away from the plate 31 and thus toward the friction clutch means so that the springs 53 and 54 serve the dual purpose of maintaining the brushes against the plate 31 and the disc 34 urged toward the friction clutch means to be driven by the latter. Thus, whenever the shaft 28 is driven by the motor 20 the friction clutch means will rotate the disc 34 as well as the ratchet wheel 35 assuming that the electromagnet 37 is energized so that the pawl 36 is out of engagement with the ratchet wheel. However, when the electromagnet 37 is unenergized, then the pin 45 of the pawl 36 will engage a tooth 44 of the ratchet wheel 35 so that further rotation of the disc 34 is prevented and this disc 34 will remain stationary even though the shaft 28 and the friction-clutch means continue to rotate.

The face of the plate 31 which is directed toward the disc or carrier 34 carries a slip ring 61 which is electrically conductive and which concentrically surrounds the shaft 28 so that it is coaxial with the disc 34, and in addition there is arranged on this face of the plate 31 a circular row of commutator segments 62 insulated from each other by the material of the plate 31 and respectively corresponding to the several keys of the row 12. The circular row of segments 62 is also concentric with the shaft 28 and coaxial with the disc 34. The radii of the slip ring 61 and row of segments 62 correspond respectively to the radial distances of the brushes 57 and 58 from the axis of the shaft 28, so that the brush 57 engages the slip ring 61 and the brush 58 engages the row of segments 62, and during rotation of the disc 34 the brush 57 will of course slide along the slip ring 61 while the brush 58 will slide along the several segments 62. Each of the segments 62 is in electrical connection with an elongated extension 63, and the several extensions 63 terminate at their ends distant from the segments 62 in eyes 64 to which electrical conductors are adapted to be soldered, for example. The slip ring 61, the segments 62, and their electrically-conductive extensions 63 preferably take the form of a printed circuit located on the plate 31.

Of course, while only the details of the unit 19 has been described above, each of the units 19a, 19b and 19c has an identical construction.

Figure 6:
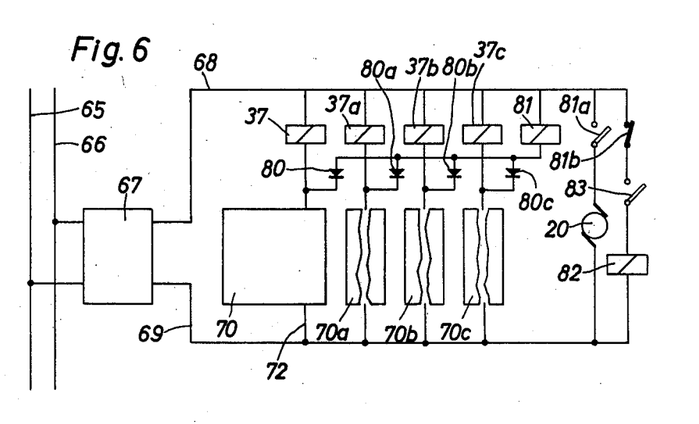
FIG. 6 is a block diagram showing the electrical circuitry for the structure of the invention.
Figure 7:
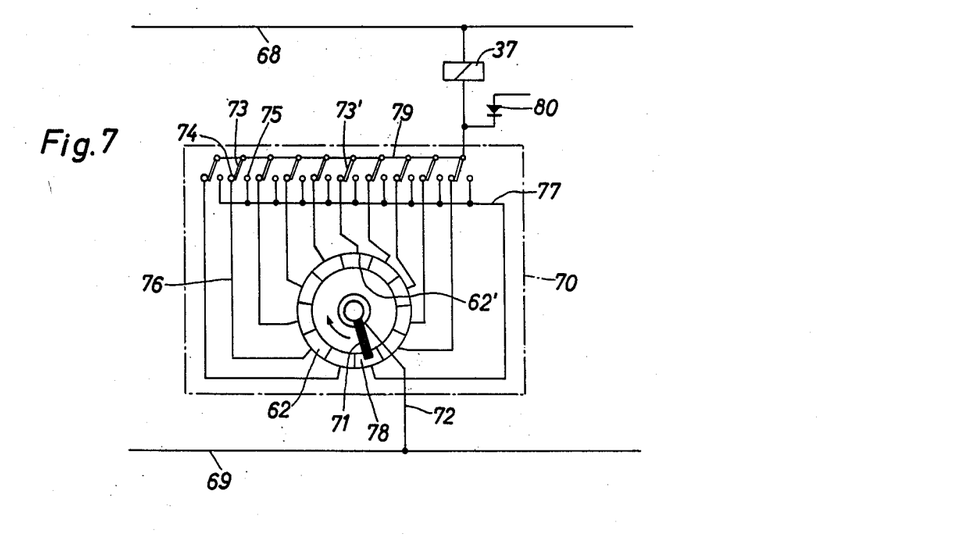
FIG. 7 shows in detail the wiring of one of the units of FIG. 6.

The electrical structure of the indicator device of the invention is illustrated in greater detail in FIGS. 6 and 7. FIG. 6 shows the lines 65 and 66 which provide a source of alternating current, and the power supply 67 is connected to these lines and provides a rectified current of desired characteristics in a well known manner. An electrical conductor 68 is connected to the positive pole of the power supply 67, while a conductor 69 is connected to that pole of the power supply which is itself connected to ground. The several electromagnet means 37, 37a, 37b and 37c, are connected between the lines 68 and 69 in parallel with each other, and each of these electromagnet means is in series with a circuit arrangement. Thus, the electromagnet 37 is in series with a circuit arrangement 70 whose details are shown in FIG. 7, and in the same way this several electromagnets 37a, 37b, 37c are in series with the circuit arrangements 70a, 70b and 70c. Referring to FIG. 7, it will be seen that the circuit arrangement 70 includes a plurality of electrical circuits any one of which is adapted to be opened by the operator when making a selection of one of the keys of the row 12, and the slip ring and commutators segment arrangement as well as the brushes and discs cooperating therewith actually provide a scanning system which scans the several circuits until it finds which one has been opened by the operator, and then of course the rotation of the disc 34 stops in a manner described below. FIG. 7 shows the row of commutator segments 62 surrounding the slip ring 61, and FIG. 7 diagrammatically indicates a bridge 71 which turns along and slidably engages the slip ring and commutator segments to connect them electrically to each other. Actually, this bridge 71 is a diagrammatic illustration of the brushes 57 and 58 as well as their electrical connection to each other, these brushes turning as a unit around the comon axis of the slip ring and row of commutator segments. An electrically conductive pin is fixed to the slip ring 61 and extends therefrom to the side of the plate 31 which is not visible in FIG. 4, and this pin is connected to the conductor 72 shown in FIG. 7, this conductor being in turn electrically connected to the line 69, so that in this way the slip ring 61 is connected to ground. The several segments 62, on the other hand, as well as the additional commutator segment 78 shown in FIG. 7 are electrically connected through separate circuits to the several switches 73. Thus, the several conductors 76 serve to interconnect the several segments 62 with a plurality of contacts 74 respectively engaged by the switch members 73 in the positions thereof illustrated in FIG. 7, while a conductor 77 interconnects the segment 78 with the several contacts 75 which are adapted to be engaged by the switch members 73 when these switches are in their positions which are not illustrated in FIG. 7. Thus, each switch member 73 is movable between the pair of contacts 74 and 75. The several switch members 73 are connected to a common conductor 79 so that they are all electrically connected to each other, and this conductor 79 serves to connect all of the switch members 73 to the electromagnet 37 which is in turn connected to the positive conductor 68. The several keys of the row 12 respectively cooperate with the several switches 73 for actuating these switches, and when one of the keys is pressed the switch which cooperates therewith is actuated so that the switch member 73 moves from a contact 74 to a contact 75. Thus, all of the switches which correspond to keys of the row 12 which are not depressed have their switch members 73 respectively in engagement with the corresponding contacts 74, while only the switch member 73 which is actuated by the depressed key of the row 12 engages the cooperating contact 75.

The several circuit arrangements 70a, 70b, 70c which are respectively connected electrically with the electromagnets 37a, 37b, and 37c are constructed identically with the circuit arrangement 70 illustrated in FIG. 7. The unillustrated switches of the circuit arrangement 70a are respectively actuated by the keys of the row 13, while the switches of the circuit arrangement 70b are actuated by the keys of the row 14 and the switches of the circuit arrangement 70c are actuated by the keys of the row 15.

Each row of keys is arranged in a well known and unillustrated manner so that when one key is depressed the previously depressed key will move back up to its rest position, and the depressed key will remain locked in its depressed condition until another key is depressed, unillustrated return springs cooperating with the keys to return them to their rest positions upon depression of a selected key. Thus, whenever the operator depresses one of the keys of one of the rows only that key will remain depressed while all of the other keys will be in their rest positions and of course the switches which cooperate therewith will have their switch members in engagement with the contacts 74, as described above, and the key which has been depressed will remain depressed until another key of the same row has been depressed. The several rows 12–15 are entirely independent of each other so that the depression of the keys of any one row will have no influence on the keys of the other rows.

The several electromagnets 37, 37a, 37b, and 37c are connected in parallel with a relay coil 81 which is connected to the several electromagnets through the rectifiers 80, 80a, 80b and 80c, respectively, which limit the flow of current from the relay 81 to the several circuit arrangements 70–70c and prevent the flow of current in the reverse direction. The electric motor 20 is connected between the conductors 68 and 69, as shown in FIG. 6, and in addition an electromagnet 82, which is not shown in FIGS. 1–5, is connected between the lines 68 and 69 in parallel with the motor 20. A switch 83 is connected with the electromagnet 82 for controlling the latter, and when the electromagnet 82 is energized it will move a pressure plate 84 shown in FIG. 2 upwardly so that the copy paper 3 which is to receive the indication will be moved against the several discs 34 to receive an impression of the symbols 42 which are in a position indicating those keys of the several rows 12–15 which have been selected by the operator. Between the several discs 34 and the copy paper 3 which moves along a path which extends perpendicular to the shaft 28 there is an inking ribbon 85 or the like which in a well known manner serves to transmit from the symbols 42 an impression of these symbols onto the paper 3 so that the selection made by the operator is in this way recorded on the paper 3.

The normally open switch 81a and the normally closed switch 81b are controlled by the relay 81 and are respectively located in the circuits of the motor 20 and the electromagnet 82. Thus, when the relay coil 81 is unenergized the switch 81a will be open so that the motor 20 cannot be energized and at this time the switch 81b is closed so that it is possible by closing the switch 83 to energize the magnet 82.

In the starting position of the apparatus, when none of the keys of the rows 12–15 are depressed, the electrical structure is in the position indicated in FIGS. 6 and 7. At this time the bridge 71 has the position indicated in FIG. 7 so that the brush 58 of the unit 19 engages the commutator segment 78 which is electrically connected with the several contacts 75 of the several switches. All of the other units are in the same position, and therefore at this time the several electromagnets 37, 37a, 37b, 37c as well as the relay 81 are unenergized. Therefore, all of the discs 34 of the several units are stationary since the several pawls are in engagement with the several ratchet wheels, and also the motor 20 is not operating.

If the operator now depresses one of the keys of the row 12 in order to provide for the red portion of the exposure a setting different from the basic setting, then the switch which corresponds to the depressed key has its switch member 73 moved into engagement with the cooperating contact 75, and in this way the circuit of the electromagnet 37 and the relay 81 is completed. As a result of the energizing of the relay 81 and the electromagnet 37 the pawl 36 is raised from the ratchet wheel 35 to release the disc 34 and at the same time the switch 81a closes so as to energize the motor 20. The shaft 28 therefore begins to rotate so that the friction clutch means drives the disc 34 and of course the brushes 57 and 58 respectively move along the slip ring 61 and the row of segments 62. Inasmuch as the frictional resistance between the carbon brushes 57 and 58 and the metallic slip ring 61 and segments 62, 78, which may be made of copper, for example, is substantially smaller than the frictional resistance between the ring 33 of cork or the like and the wheel 35, the driving of the disc 34 through the friction-clutch means is reliably guaranteed.

Assuming that the operator has depressed that key of the row 12 which is associated with the switch 73' indicated in FIG. 7, then of course this switch member 73' will have been turned in a counterclockwise direction, as viewed in FIG. 7, to engage the adjacent contact 75, and in this way the conductor 76 extending from the segment 62' indicated in FIG. 7 is no longer connected electrically with the conductor 79. The rotary disc 34 together with the brushes forms a scanner, as described above, and the unit continues to turn until the brush 58 "finds" the segment 62' which has had the circuit in which it is located opened by the selection of the operator. As soon as the brush 58 reaches the segment 62' the flow of current through the electromagnet 37 will be terminated and of course the relay 81 will also become unenergized. The de-energizing of the electromagnet 37 causes the stop means formed by the pawl and ratchet to be automatically released so as to stop the turning of the disc 34, and at the same time the motor 20 is turned off. In this way there will be precisely located in a fully automatic manner at the opening 43 of the housing 16 the particular symbol 42 which corresponds to the key of the row 12 which has been depressed by the operator.

If, later on, another key of the row 12 is depressed, then the previously depressed key will return to its initial position and the switch actuated thereby will also be returned to its initial position, while the switch corresponding to the second-depressed key will be actuated to have its switch member 73 moved into engagement with the cooperating contact 75. Of course, the brush 58 is still in engagement with the segment 62', but by the depression of another key the circuit is of course closed and the disc 34 together with the brushes will now turn until the brush 58 "finds" that segment which is connected electrically with the switch 73 which has been opened by depression of another key of the row 12. The depression of this other key of course causes the electromagnet 37 to become energized and also the relay 81 to become energized so that the disc 34 is released for turning and the motor 20 starts to drive the apparatus in a manner described above. When the brush 58 "finds" that one of the circuits 76 which has been opened by the operator, the operations will again stop and there will be located at the opening 43 a symbol 42 corresponding to the last-selected key of the row 12.

When it is desired to return the parts to their starting position shown in FIG. 7, without depressing another key of the row 12, for example, which may be done by depressing any one of the keys only part way so that the previously depressed key will snap up to its starting position while the operator may release the partly depressed key so that it will return to its starting position, then all of the switches will have the position indicated in FIG. 7 and the relay 81 and magnet 37 will again become energized, and the disc 34 together with the brushes will again turn until the brush 58 finds the segment 78, and at this time the apparatus will automatically stop with the parts in the position indicated in FIG. 7. Of course, the return of the brush 58 to the segment 78 under these conditions cuts off the flow of current through the relay 81 and the magnet 37.

The operation of all of the other units is identical with that described above for the unit 19.

It is not necessary to actuate the keys of the several rows in succession. The operator may simultaneously depress different keys of the several rows, and the several discs 34 can be driven simultaneously, the relay 81 remaining automatically energized until the last disc has reached the selected position. Only when this last disc has moved to its selected angular position will the relay 81 become unenergized so as to stop the operation of the motor 20.

Because those discs 34 of the units which are not actuated during their particular operation or which have already reached the selected position remain locked in position, these discs will not be turned while another disc is being turned during rotation of the shaft 28.

Of course, it follows that the switch 81b will remain open as long as the relay 81 is energized and thus as long as all of the discs have reached the positions where they accurately indicate the keys selected by the operator, and it is only at this time that the switch 81b will close, which is to say when the relay 81 is unenergized, so that a closing of the switch 83 will energize the magnet 82 to cause a transfer to the copy paper 3 of the symbols which indicate the selection made by the operator. Thus, it is not possible with the structure of the invention to print on the copy paper an indication before the structure has completed its operation to provide an accurate indication of those keys which have been selected by the operator, and in this way inaccuracies are avoided reliably.

It is preferred to actuate the switch 83 by the structure which feeds the copy paper in a stepwise fashion, and in this way the switch 83 will be closed only directly after the exposure has been completed and just before the copy paper is advanced through a distance which will place it in position to receive the next exposure. In other words, the printing takes place just before the copy paper 3 is advanced by a distance equal to the length of the photograph. Since the several keys of the rows 12–15 are actuated before an exposure of the copypaper, the accurate positioning of the several discs 34 before closing of the switch 83 is guaranteed.

Figure 8:
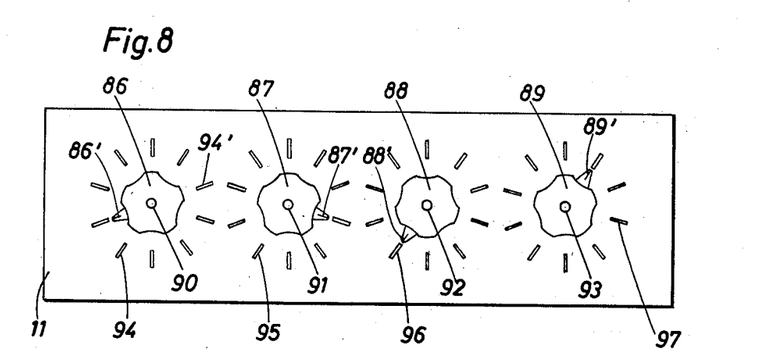
FIG. 8 is a diagrammatic illustration of an embodiment of a manually operable selecting means differing from the embodiment which is illustrated in FIG. 1.

Of course, it is not absolutely essential that the plurality of manually operable selecting means take the form of rows of keys. For example, instead of rows of keys 12–15 on the switchboard 11 it is possible to provide the rotary knobs 86–89, as illustrated in FIG. 8. These knobs 86–89 are respectively turnable about the pins 90–93 and are respectively fixed to the indexes 86'–89' which respectively cooperate with the scales 94–97, so that in this way the plurality of manually operable selecting means may take the form of rotary members which are turned to predetermined angular positions according to the selections made by the operator. The knobs 86–89 may control, for example, potentiometer sliders for color and density correction of a device shown particularly in FIG. 2 of the U.S. patent application Serial Number 842,290, of September 25, 1959.

Several turnable knobs 86–89 respectively cooperate with the several units referred to above in connection with FIGS. 2–5, and the symbols 42 carried by the discs 34 of the several units respectively correspond to the graduations of the several scales 94–97.

Figure 9:
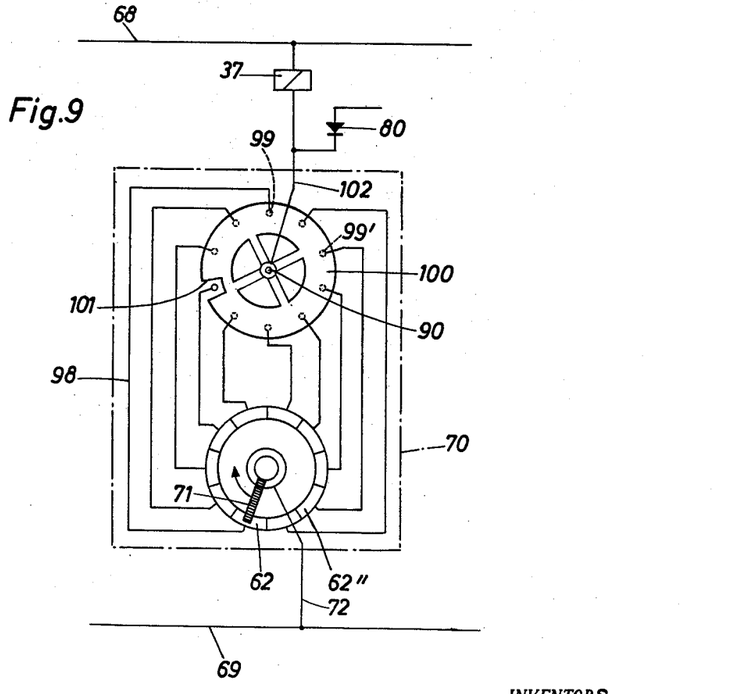
FIG. 9 illustrates how one of the manually operable selecting means of FIG. 8 cooperates electrically with the remaining electrical structure of one of the indicating units of the structure of the invention.

The wiring arrangement illustrated in FIG. 6 is also used with the structure of the invention, in this case the circuit arrangements 70, 70a, 70b, 70c have the construction which is indicated for the circuit arrangement 70 in FIG. 9. Thus, referring to FIG. 9 it will be seen that the several commutator segments 62 are respectively connected by the conductors 98 to the several contacts 99 which are arranged along a circle and respectively correspond to the several segments 62. The row of contacts 99 is arranged along a circle concentric with the pin 90 which guides the knob 86 for rotary movement, and this knob 86 fixedly carries a sleeve through which the pin 90 extends, this sleeve being fixed to the ring 100 shown in FIG. 9, so that the ring 100 turns with the knob 86. This spring 100 engages the contacts 99 and is formed at its periphery with a notch 101 so that one of the contacts 99 will be located in the notch 101, or in alignment therewith, out of engagement with the ring 100, and the particular contact 99 which is in alignment with the notch 101 and therefore out of engagement with the ring 100 is determined by the graduation 94 which is selected by the operator. The size of the notch 101 is such that only one of the contacts 99 will be out of engagement with the ring 100 at any one time, and the angular distance between the contacts 99 corresponds to the angular distance between the graduations 94 so that the several contacts 99 respectively correspond to the graduations 94 and the index 86' will be aligned by the operator with a graduation 94 which corresponds to that contact 99 which is aligned with the notch 101. Of course, the ring 100 is electrically conductive so that all of the contacts 99 which engage the ring 100 are electrically connected to each other. The conductor 102 connects the ring 100 electrically with the electromagnet 37 as well as with the rectifier 80 in the manner shown in FIG. 9.

The remaining circuit arrangements 70a, 70b and 70c of the embodiment of FIGS. 8 and 9 are identical with that illustrated in FIG. 9 so that the several knobs 87–89 may be manipulated to place a selected contact 99 of the other circuit arrangements in alignment with the notch 101 of each of their rings 100.

When the brush 58 of the bridge 71 engages that segment 62 which is connected electrically with the contact 99 which is aligned with the notch 101, there will be no current flowing through the relay 81 or the electromagnet 37 and therefore the motor 20 is not operating and the pawl 36 engages the ratchet 35. If the knob 86 is now turned so that the index 86' is aligned with another graduation 94, such as the graduation 94' shown in FIG. 8, then the contact ring 100 will be turned so that the notch 101 is aligned with the contact 99' indicated in FIG. 9, and in this way the contact 99 which previously was aligned with the notch 101 is placed in engagement with the ring 100. The electromagnet 37 and the relay 81 will therefore be energized in the manner described above so that the disc 34 will be turned, and the disc 34 continues to turn until the brush 58 "finds" that segment, in this case the segment 62", which is connected electrically with the contact 99', and now the electromagnet 37 and the relay 81 again become unenergized and the motor 20 stops operating while the disc 34 is locked by the stop means 36, 35 in that position where the symbol 42 which is aligned with the opening 43 corresponds with the selected contact 99', which is to say the selected graduation 94'.

In other respects the embodiment of FIGS. 8 and 9 corresponds to that described above both in its structure and in its operation. However, with the embodiment of FIGS. 8 and 9 it is unnecessary to provide an additional commutator segment similar to the segment 78 shown in FIG. 7.

Figure 10:
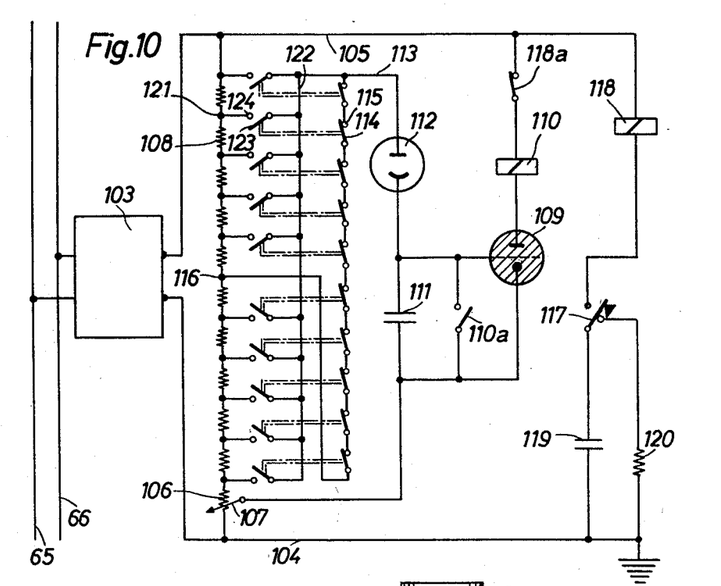
FIG. 10 is a wiring diagram of the circuit for controlling the exposure to red.

As may be seen from FIG. 10, the structure for controlling exposure to red light includes the unit 103 which is connected to the lines 65 and 66 which supplies alternating current to the unit 103, and this unit provides in a well known way a stabilized direct current. A pair of conductors 104 and 105 are electrically connected to the output of the unit 103, and the conductor 104 is connected to ground while the conductor 105 has the positive polarity of the D.C. voltage.

A voltage divider is arranged between the conductors 104 and 105 and includes the ten series-connected resistors 108 as well as the calibrating potentiometer 106. Between the adjustable element 107 of the calibrating potentiometer 106 and the conductor 105 is connected a switch tube 109 in the form, for example, of a thyratron. The relay 110 is located in the anode circuit of the thyratron 109. A timing condenser 111 is connected electrically to the grid and cathode of the tube 109, and the plate of the condenser 111 which is connected to the grid of the tube 109 is also connected electrically with the photocell 112 which receives the red light. The conductor 113, which is connected to the anode side of the photocell is connected by way of the ten series-connected normally closed switches 114, 115 to the central contact 116 of the voltage divider formed by the ten resistors 108.

A change-over switch 117, which is provided with a return spring, a relay 118, and a condenser 119 with its discharging resistor 120 are connected in parallel with the tube 109 and its relay 110. The relay 118 controls the normally closed switch 118a which is in the anode circuit of the tube 109, while the relay 110 controls the normally open switch 110a which is connected in parallel with the condenser 111 as well as an unillustrated further switch which in a known way serves to energize and deenergize the light source for the red light.

In the non-operating condition of the circuit the parts take the position illustrated in FIG. 10 and the switch for the source of red light is closed. When voltage is supplied to the circuit and the switch 117 is moved from the position shown in FIG. 10 to the position closing the circuit through the relay 118, this relay becomes energized and opens the switch 118a only for the short period of time required to charge the condenser 119, whereupon the relay 118 becomes unenergized and the switch 118a again closes. During the exposure of the copy paper to red light, the photocell 112 also receives red light and generates a current which charges the timing condenser 111 up to the ignition potential of the tube 109. As soon as the tube 109 is ignited the relay 110 becomes energized to open the switch which energizes the light source for red light, so that the exposure to the red light terminates, and in addition the relay 110 closes the switch 110a so as to discharge the condenser 111. The tube 109 continues to carry current and only becomes extinguished when the operator again actuates the switch 117 so as to momentarily open the switch 118a in order to initiate another operating cycle.

The period of time required to charge the timing condenser 111 up to the ignition potential of the tube 109, and thus the period of time during which the copy paper is exposed to red light, is dependent upon the intensity of the red light received by the photocell 112 as well as upon the voltage applied to the condenser 111 and the photocell 112.

If it is desired to introduce a color correction by changing the degree to which the copy paper is exposed to red light, then, for example, such a correction may be made by changing the voltage applied to the timing condenser 111 and the photocell 112. For this purpose ten taps 121 are symmetrically arranged with respect to the central tap 116 in the voltage divider formed by the ten resistors 108, and the photocell 112 can be connected electrically either with the central tap 116, as shown in FIG. 10, or with a selected one of the taps 121. For this purpose a conductor 122 is connected with the conductor 113 and is also connected with ten switches 123 which cooperate respectively with contact 124 which are respectively connected to the taps 121. Each switch 123 is coupled with a corresponding switch 114 so that when a selected switch 123 is closed the switch 114 which is coupled to the closed switch 123 automatically opens. Thus, the closing of any one of the switches 123 breaks connection between the central tap 116 and the photocell 112, and this latter connection is again closed when the previously closed switch 123 is opened.

Thus, at the end of each operating cycle the tube 109 still carries curent so that the relay 110 remains energized and thus maintains the switch 110a closed, so that the condenser 111 is discharged, and the switch for the light source open so that the light source remains extinguished. When the switch 117 is actuated to initiate the next operating cycle, the energized relay 118 opens the switch 118a so that the tube 109 and relay 110 become deenergized, the switch 110a opens so that the condenser 111 can again become charged, and of course the light source switch closes to again energize the light source.

Figure 11:
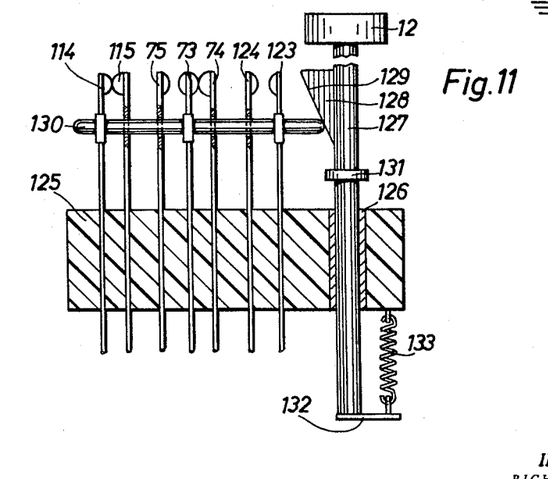
FIG. 11 shows a manually operable key and the switches controlled thereby.

As may be seen from FIG. 11, each key of the row of keys 12 controls not only a switch 73, as indicated in FIG. 7, but also one of the switchs 114 and 123 of FIG. 10, and of course the number of switches 73, 114 and 123 corresponds to the number of keys in the row of keys 12. These switches are formed by contact members carried by leaf springs, and all of the leaf springs are carried by a common support 125 made of an electrically non-conductive material and carrying in a suitable bore a sleeve 126 through which the rod 127 extends so as to be guided by the sleeve 126, this rod 127 being connected to and supporting the upper part of the key 12 which is engaged by the operator. The rod 127 has a wedge-shaped projection 128 whose inclined surface 129 is engaged by an end of a push rod 130 which is fixed with the leaf springs of the switches 114, 73, and 123 and which passes freely through openings formed in the leaf spring which carry the contacts 115, 75, 74, and 124, so that with this construction these latter contacts are not moved upon depression of the rod 127.

This rod 127 carries a stop ring or collar 131 as well as a plate 132 to which is connected a return spring 133 whose opposite end is connected to the support 125. The structure for locking a selected key 12 in its depressed position is well known and therefore not illustrated. The remaining keys 12 and switch assemblies associated therewith are identical with the structure shown in FIG. 11.

The photoelectric control structures for controlling the exposure to green and blue light are respectively identical with the structure shown in FIG. 10 and described above for controlling the exposure to red light, and the rows of keys 13 and 14 as well as the switch assemblies cooperating therewith are identical with that shown in FIG. 11.

For the sake of providing the most compact construction which will save the greatest amount of space, it is preferred and desirable to locate all of the symbols 42 on a single carrier 34, but it is of course possible, within the scope of the invention, to provide a structure where each of the symbols has its own separate carrier which may be separately moved to place the symbol in an indicating position. In such a construction the several carriers for the several symbols of each unit will have a plurality of electromagnets respectively cooperating therewith, and the several electromagnets will in this case cooperate with the several symbol carriers to be energized upon depression of a key of the row 12 or 13-15, or by turning of any of the knobs 86-89, so that with such an arrangement the particular symbol selected will be placed in an indicating position by energizing of the electromagnet connected thereto. In other words with this arrangement where individual carriers are provided for the individual symbols, the depression of the keys will energize cooperating electromagnets to automatically move to indicating position symbols corresponding to the selected keys. In other words, with such an arrangement the several electromagnets of each unit will be connected in series with the several keys or with the several contacts cooperating with the dial 86, for example, and in each of these circuits is located a switch which is normally open but which is closed when that particular circuit is selected, so that with such an arrangement the operator will energize the electromagnet which cooperates with the selected key or scale graduation in order to move a carrier which carries a corresponding symbol into a position where this latter symbol will transfer its impression to the printing paper.

Of course, the invention is not limited to four indicating units. A greater or lesser number of indicating units may be provided in the event that more or less exposure or other factors or variables are to be adjusted with the photographic apparatus. When there are more than four indicating units, the several discs or carriers 34 can also have the above-described construction and can be turnable on the common drive shaft 28. In view of the extremely small space occupied by each indicating unit, an assembly of a relatively large number of the indicating units also requires an extremely small amount of space, so that it is possible with the invention to provide on copy paper of conventional width ten symbols simultaneously one next to the other, even when the row of symbols, as in the embodiment of FIG. 1, extends perpendicularly to the direction of movement of the copy paper 3.

For example, in addition to the rows of keys 12-15 or the rotary knobs 86-89 for providing color and density or contrast corrections, it is possible to have a further rotary knob which may be turned for selecting one of a plurality of differently calibrated elements to be placed in the circuit of the photoelectric exposure controlling device to influence the exposure in accordance with an aditional variable, and an additional indicating unit constructed as described above in accordance with the present invention may be controlled so that there will be on the copy paper a symbol indicating the setting of such an additional knob to place an additional value of an additional variable on the copy paper. The photographic reproducing machine may have an additional source of light capable of directly influencing the copy paper or the like so as to influence its contrast characteristics, and with such an arrangement it is possible to provide an adjusting unit to adjust the amount of additional light which is applied to the copy paper, and this adjustable structure may actuate an indicator unit as described above so as to provide on the photograph a record of the setting used for applying the additional light to the copy paper.

In the same way it is of course possible in accordance with the invention to provide on the copy paper an indication of the order or job number, and this number may be derived from an additional field of keys capable of being actuated by the operator to indicate the order or job number. These keys may be arranged on or in the vicinity of the switchboard 11 and actuate corresponding indicating units as described above. The order or job number can be derived from additional stamping or printing units as described above and if desired may be placed not or not only on the photographs themselves but rather on the envelope or the like in which all of the photographs of a particular order or job are located.

While it is preferred because of simplicity and compactness to provide a common drive shaft 28 for driving the several friction-clutch means, it is also possible to arrange these friction-clutch means freely turnable on the shaft 28 and to connect to the several friction-clutch means gears which respectively mesh with additional gears which are driven by a separate shaft operatively connected to the motor 20 to be driven thereby.

Furthermore, while it is preferred to use the springs 53 and 54 for the double function referred to above of pressing the brushes against the plate 31 and urging the disc 34 toward the friction clutch means, it is possible instead to provide additional springs for urging the several discs respectively toward the several friction clutch means. Also, instead of providing leaf springs 53, 54 with the brushes 57, 58, it is possible to connect to the side of the disc 34 which is directed toward the plate 31 a pair of curved contact springs fixed to the disc 34 and having free curved ends which press respectively against the slip ring 61 and the row of segments 62 to provide the electrical connections described above. Also, the slip ring 61 and the commutator segments 62 may be arranged on the inner surface of a cylinder which is coaxial with and surrounds the shaft 28, and in such a construction the row of commutator segments and the slip ring would be located one next to the other and the brushes 57 and 58 would extend radially from the disc 34 or from a suitable carrying element fixed to the disc 34 and carrying the brushes in such a construction.

Thus, while variations are possible, nevertheless the construction described above in detail and shown in the drawings is preferred because of its extreme simplicity and compactness.

It is apparent that the indicator structure of the invention is not limited to use with photographic reproduction devices, and can instead be used with all devices where it is desired to indicate on of more values of several variables. For example, a device of the invention may be used with measuring instruments where the measurements are recorded on a suitable strip. In this latter event the turning of the contact ring 100 of FIG. 9 can take place through an automatic control rather than by hand, for example by a suitable electrical instrument. Where the several commutator segments 62 are sufficiently small, it is possible to provide symbols which, instead of taking the form of numerals, letters, or the like, can simply take the form of dashes of different lengths, different widths, or even different groups of different numbers of dashes, so that in this way it is possible to provide an extremely large number of symbols, corresponding to an extremely large number of commutator segments.

In addition, instead of recording the symbols indicated by the indicating means through a suitable printing or stamping arrangement, it is also possible to provide an arrangement where the indicated symbols are simply rendered visible by rendering the opening 43 of the housing 16 visible. In this event the symbols 42 need not take the form of printing types, and of course a pressure plate 84 and structure for operating the same can be eliminated It should be noted that the invention is applicable to cameras as well as to photographic copying devices. While the structure of the invention would not be applied to cameras intended for amateurs, nevertheless it is perfectly feasible and of considerable advantage to use the indicating structure of the invention on special cameras used, for example, for scientific purposes. With such cameras when the rings which set the exposure time and the diaphragm are turned, these rings will also control the above-described units so that there will be provided a record of the exposure values used on the camera to make a particular photograph. The arrangement may be such that there will be printed on the edge of each photograph derived from the camera the setting of the exposure time and diaphragm, so that in this way the photographer will know what settings were used for the several photographs.

It will be understood that each of the elements described above, or two or more together, may also find a useful application in other types of indicating devices differing from the types described above.

While the invention has been illustrated and described as embodied in combined control and indicating assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, faily constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic device, in combination, a plurality of manually operable selecting means operable by the operator for selecting one of several values of a plurality of exposure-determining factors respectively regulated by said plurality of manually operable selecting means; a first means formed by a plurality of carriers each carrying symbols, said carriers respectively corresponding to said plurality of selecting means and said symbols respectively corresponding to the values which can be selected with said plurality of selecting means; support means supporting said plurality of carriers for movement each independently of the other; means actuated by operation of said plurality of manually operable selecting means and cooperating with said plurality of carriers for automatically moving the same to positions where the marking symbols thereof are respectively in marking positions to indicate the values selected by the operator at said plurality of manually operable selecting means; a second means supporting a photographic sheet with its reverse side directed toward said symbols which are in said marking positions; and moving means located adjacent one of said first and second means for moving said one means toward the other of said first and second means to record on the reverse side of said photographic sheet said marking symbols which are in said marking positions.

2. In a machine for providing photographic reproductions, in combination, at least one manually operable selecting means for providing for the operator a selection of one of several exposure-determining values; at least one carrier carrying marking symbols which respectively correspond to said values; support means supporting said carrier for movement to a plurality of positions where said plurality of symbols will respectively indicate the selected value; means actuated by operation of said manually operable selecting means and cooperating with said carrier for automatically moving the same to a position where the indicating symbol corresponds to the value selected at said manually operable selecting means; and moving means located adjacent said carrier for moving toward the same a photographic sheet having its reverse side directed toward said carrier so that the marking symbol corresponding to the selected value records the selected value on the photographic sheet.

3. In a machine for providing photographic color reproductions, in combination, a plurality of manually operable selecting means for selecting one of a plurality of exposure values for a plurality of basic colors respectively corresponding to said plurality of selecting means; a plurality of adjusting means operatively connected to said plurality of selecting means, respectively, for adjusting the extent to which a light-sensitive sheet is exposed to said basic colors in accordance with the exposure value selected; a first means constituted by a plurality of carriers respectively corresponding to said plurality of selecting means and each carrying a plurality of symbols respectively indicating the exposure values of each of the selecting means; support means supporting said plurality of carrier means for movement each independently of the other to positions where the symbols thereof will indicate exposure values; means actuated by said plurality of manually operable selecting means and cooperating automatically with said plurality of carrier means for automatically moving the same to positions where the symbols thereof will indicate the selections made by said plurality of manually operable selecting means; a second means supporting a photographic sheet with its reverse side directed toward said symbols which are in said positions, said symbols being adapted to be recorded on the reverse side of said photographic sheet; and moving means located adjacent one of said first and second means for moving said one means toward the other of said first and second means to record on the reverse side of said photographic sheet said symbols which are in said positions.

4. An indicating assembly comprising, in combination, a rotary shaft; drive means operatively connected to said shaft rotating the same; a plurality of discs distributed along said shaft and freely turnable thereon, each of said discs carrying a plurality of indicating symbols; a plurality of friction clutch means distributed along and fixed to said shaft for rotation therewith and respectively cooperating with said plurality of discs for rotating the same when said shaft is driven; a plurality of stop means respectively cooperating with said discs for stopping the rotation thereof at different angular positions where different symbols of said discs will indicate certain information; and control means cooperating with said plurality of stop means for automatically actuating the same to stop the rotations of said discs when the symbols thereof indicate a selected value of the information; and means operatively connected to said drive means for automatically stopping the operation thereof as soon as said discs have reached positions where the symbols thereof indicate said selected value.

5. An indicating assembly comprising, in combination, a rotary drive shaft; a plurality of discs distributed along and freely turnable on said shaft; a plurality of friction clutch means fixed to said shaft for rotation therewith and respectively cooperating with said discs for rotating the same; a plurality of ratchet wheels respectively fixed to said discs, said ratchet wheels respectively having teeth which respectively correspond to symbols carried by said discs at the peripheries thereof; a plurality of pawls respectively cooperating with said ratchet wheels for engaging the same to stop the rotation of said discs; a plurality of electromagnet means respectively cooperating with said pawls for maintaining the same, when said plurality of electromagnet means are energized, away from said ratchet wheels to free said discs for rotation with said friction clutch means; a plurality of selecting means for selecting symbols of said discs; and electrical means actuated by said discs during rotation thereof for maintaining said plurality of electromagnet means energized until said discs reach angular positions where the symbols thereof indicate the selections made with said plurality of selecting means so that when the latter positions of said discs are reached said electromagnetic means become automatically unenergized and said discs stop at positions where the symbols thereof indicate the selections made with said plurality of selecting means.

6. An indicator assembly comprising, in combination, a rotary shaft; a disc freely turnable on said shaft and carrying at its periphery a plurality of indicating symbols; friction clutch means fixed to said shaft and cooperating with said disc for rotating the same; a ratchet wheel fixed to said disc and having a plurality of teeth respectively corresponding to said symbols; a pawl cooperating with said ratchet wheel for preventing turning thereof and said disc therewith when said pawl engages said ratchet wheel; spring means cooperating with said pawl for urging the same to a position engaging said ratchet wheel; an electromagnet cooperating with said pawl for moving the same, when said electromagnet is energized, in opposition to said spring means away from said ratchet wheel to release said disc for rotation with said friction clutch means and shaft; a slip ring coaxial with said disc; a circular row of commutator segments also coaxial with said disc; a pair of electrically interconnected brushes carried by said disc for rotation therewith and respectively engaging said slip ring and said row of commutator segments; a plurality of electrical circuits respectively connecting said segments electrically with said electromagnet and slip ring so that when all of said circuits are closed said electromagnet will remain energized during turning of said disc; and selecting means for opening a selected one of said circuits so that when the brush which engages said segments reaches that segment which forms part of the open circuit the electromagnet will become unenergized and said spring means will move said pawl into engagement with said ratchet wheel to stop the rotation of said disc at an angular position corresponding to the angular position of the commutator segment of the circuit which has been opened.

7. An indicator assembly comprising, in combination, a rotary shaft; a disc freely turnable on said shaft and carrying at its periphery a plurality of indicating symbols; friction clutch means fixed to said shaft and cooperating with said disc for rotating the same; a ratchet wheel fixed to said disc and having a plurality of teeth respectively corresponding to said symbols; a pawl cooperating with said ratchet wheel for preventing turning thereof and said disc therewith when said pawl engages said ratchet wheel; spring means cooperating with said pawl for urging the same to a position engaging said ratchet wheel; an electromagnet cooperating with said pawl for moving the same, when said electromagnet is energized, in opposition to said spring means away from said ratchet wheel to release said disc for rotation with said frictional clutch means and shaft; a slip ring coaxial with said disc; a circular row of commutator segments also coaxial with said disc; a pair of electrically interconnected brushes carried by said disc for rotation therewith and respectively engaging said slip ring and said row of commutator segments; a plurality of electrical circuits respectively connecting said segments electrically with said electromagnet and slip ring so that when all of said circuits are closed said electromagnet will remain energized during turning of said disc; and selecting means for opening a selected one of said circuits so that when the brush which engages said segments reaches that segment which forms part of the open circuit the electromagnet will become unenergized and said spring means will move said pawl into engagement with said ratchet wheel to stop the rotation of said disc at an angular position corresponding to the angular position of the commutator segment of the circuit which has been opened; a plate perpendicular to said shaft and carrying said commutator segments, and the brush which engages said commutator segments extending parallel to said shaft.

8. An indicator assembly comprising, in combination, a rotary shaft; a disc freely turnable on said shaft and carrying at its peripherly a plurality of indicating symbols; friction clutch means fixed to said shaft and cooperating with said disc for rotating the same; a ratchet wheel fixed to said disc and having a plurality of teeth respectively corresponding to said symbols; a pawl cooperating with said ratchet wheel for preventing turning thereof and said disc therewith when said pawl engages said ratchet wheel; spring means cooperating with said pawl for urging the same to a position engaging said ratchet wheel; an electromagnet cooperating with said pawl for moving the same, when said electromagnet is energized, in opposition to said spring means away from said ratchet wheel to release said disc for rotation with said friction clutch means and shaft; a slip ring coaxial with said disc; a circular row of commutator segments also coaxial with said disc; a pair of electrically interconnected brushes carried by said disc for rotation therewith and respectively engaging said slip ring and said row of commutator segments; a plurality of electrical circuits respectively connecting said segments electrically with said electromagnet and slip ring so that when all of said circuits are closed said electromagnet will remain energized during turning of said disc; selecting means for opening a selected one of said circuits so that when the brush which engages said segments reaches that segment which forms part of the open circuit the electromagnet will become unenergized and said spring means will move said pawl into engagement with said ratchet wheel to stop the rotation of said disc at an angular position corresponding to the angular position of the commutator segment of the circuit which has been opened; and a pair of leaf springs respectively carried by said disc and respectively carrying said brushes.

9. An indicator assembly comprising, in combination, a rotary shaft; a disc freely turnable on said shaft and carrying at its periphery a plurality of indicating symbols; friction clutch means fixed to said shaft and coopertaing wtih said disc for rotating the same; a ratchet wheel fixed to said disc and having a plurality of teeth respectively corresponding to said symbols; a pawl cooperating with said ratchet wheel for preventing turning thereof and said disc therewith when said pawl engages said ratchet wheel; spring means cooperating with said pawl for urging the same to a position engaging said ratchet wheel; an electromagnet cooperating with said pawl for moving the same, when said electromagnet is energized, in opposition to said spring means away from said ratchet wheel to release said disc for rotation with said friction clutch means and shaft; a slip ring coaxial with said disc; a circular row of commutator segments also coaxial with said disc; a pair of electrically interconnected brushes carried by said disc for rotation therewith and respectively engaging said slip ring and said row of commutator segments; a plurality of electrical circuits respectively connecting said segments electrically with said electromagnet and slip ring so that when all of said circuits are closed said electromagnet will remain energized during turning of said disc; selecting means for opening a selected one of said circuits so that when the brush which engages said segments reaches that segment which forms part of the open circuit the electromagnet will become unenergized and said spring means will move said pawl into engagement with said ratchet wheel to stop the rotation of said disc at an angular position corresponding to the angular position of the commutator segment of the circuit which has been opened; and a pair of leaf springs respectively carried by said disc and respectively carrying said brushes, said disc being formed with a circular groove whose center is displaced from said shaft and said leaf springs being arcuate and located within said groove.

10. An indicator assembly comprising, in combination, a rotary drive shaft; a disc freely turnable on said shaft and carrying at its periphery a plurality of indicating symbols; friction clutch means fixed to said shaft and cooperating with said disc for rotating the same; a ratchet wheel fixed to said disc for rotation therewith; a pawl cooperating with said ratchet wheel to engage the same and stop the rotation of said disc; spring means urging said pawl to a position engaging said ratchet wheel; electromagnet means cooperating with said pawl for moving the same, when said electromagnet means is energized, in opposition to said spring means away from said ratchet wheel to release said disc for rotation with said friction clutch means and shaft; a plate extending perpendicularly to said shaft and formed with an opening through which said shaft extends; a slip ring coaxial with said disc and carried by said plate; a circular row of commutator segments also coaxial with said disc and carried by said plate; a pair of brushes engaging said slip ring and said row of segments, respectively, said disc being formed with openings in which said brushes are located so that said brushes rotate with said disc, said brushes being electrically interconnected with each other; a plurality of electrical circuits respectively connecting said commutator segments electrically with said electromagnet means and said slip ring through said brushes so that brushes during rotation of said disc maintain said electromagnet means energized to retain said pawl spaced from said ratchet wheel; and selecting means cooperating with said circuits for selectively opening one of said circuits so that when the segment of the open circuit is reached by the brush which engages said segment the electromagnet means will become unenergized and the disc will stop turning at an angle corresponding to the angular position of the commutator segment of the circuit which has been opened.

11. An indicator assembly comprising, in combination, a rotary drive shaft; a disc freely turnable on said shaft and carrying at its periphery a plurality of indicating symbols; friction clutch means fixed to said shaft and cooperating with said disc for rotating the same; a ratchet wheel fixed to said disc for rotation therewith; a pawl cooperating with said ratchet wheel to engage the same and stop the rotation of said disc; spring means urging said pawl to a position engaging said ratchet wheel; electromagnet means cooperating with said pawl for moving the same, when said electromagnet means is energized, in opposition to said spring means away from said ratchet wheel to release said disc for rotation with said friction clutch means and shaft; a plate extending perpendicularly to said shaft and formed with an opening through which said shaft extends; a slip ring coaxial with said disc and carried by said plate; a circular row of commutator segments also coaxial with said disc and carried by said plate; a pair of brushes engaging said slip ring and said row of segments, respectively, said disc being formed with openings in which said brushes are located so that said brushes rotate with said disc, said brushes being electrically interconnected with each other; a plurality of electrical circuits respectively connecting said commutator segments electrically with said electromagnet means and said slip ring through said brushes so that brushes during rotation of said disc maintain said electromagnet means energized to retain said pawl spaced from said ratchet wheel; and selecting means cooperating with said circuits for selectively opening one of said circuits so that when the segment of the open circuit is reached by the brush which engages said segment the electromagnet means will become unenergized and the disc will stop turning at an angle corresponding to the angular position of the commutator segment of the circuit which has been opened, said disc being formed at a side face directed away from said plate with a circular groove whose center is spaced from said shaft and said brushes being respectively carried by a pair of arcuate leaf springs which are fixed to said disc and located in said groove.

12. An indicator assembly comprising, in combination, a rotary drive shaft; a disc freely turnable on said shaft and carrying at its periphery a plurality of indicating symbols; friction clutch means fixed to said shaft and cooperating with said disc for rotating the same; a ratchet wheel fixed to said disc for rotation therewith; a pawl cooperating with said ratchet wheel to engage the same and stop the rotation of said disc; spring means urging said pawl to a position engaging said ratchet wheel; electromagnet means cooperating with said pawl for moving the same, when said electromagnet means is energized, in opposition to said spring means away from said ratchet wheel to release said disc for rotation with said friction clutch means and shaft; a plate extending perpendicularly to said shaft and formed with an opening through which said shaft extends; a slip ring coaxial with said disc and carried by said plate; a circular row of commutator segments also coaxial with said disc and carried by said plate; a pair of brushes engaging said slip ring and said row of segments, respectively, said disc being formed with openings in which said brushes are located so that said brushes rotate with said disc, said brushes being electrically interconnected with each other; a plurality of electrical circuits respectively connecting said commutator segments electrically with said electromagnet means and said slip ring through said brushes so that said brushes during rotation of said disc maintain said electromagnet means energized to retain said pawl spaced from said ratchet wheel; and selecting means cooperating with said circuits for selectively opening one of said circuits so that when the segment of the open circuit is reached by the brush which engages said segment the electromagnet means will become unenergized and the disc will stop turning at an angle corresponding to the angular position of the commutator segment of the circuit which has been opened, said disc being formed at a side face directed away from said plate with a circular groove whose center is spaced from said shaft and said brushes being respectively carried by a pair of arcuate leaf springs which are fixed to said disc and located in said groove, said leaf springs urging said brushes into engagement with said slip ring and said row of commutator segments respectively, and said leaf springs also, by the reaction of the urging of said brushes toward said plate, acting to urge said disc toward said friction clutch means so as to maintain said disc in driving engagement with said friction clutch means.

13. An indicator assembly comprising, in combination, a rotary drive shaft; a plurality of parallel plates respectively formed with openings through which said shaft extends and said plates being perpendicular to said shaft; a plurality of discs freely turnable on said shaft and respectively located between said plates, said discs respectively carrying at their peripheries indicating symbols; a plurality of friction clutch means fixed to said shaft for rotation therewith and respectively located also between said plates, said plurality of friction clutch means respectively cooperating with said discs for rotating the latter; a plurality of ratchet wheels respectively fixed to said discs; a plurality of pawls respectively cooperating with said ratchet wheels for preventing turning of said discs; a plurality of spring means respectively cooperating with said pawls for urging the same into engagement with said ratchet wheels, said ratchet wheels respectively having teeth which respectively correspond to the symbols carried by said discs; a plurality of electromagnet means respectively cooperating with said pawls for moving the same, when said plurality of electromagnet means are energized, away from said ratchet wheels to release said discs for rotation with said friction clutch means; a plurality of slip rings respectively carried by said plates and directed toward said discs, respectively; a plurality of rows of commutator segments respectively carried by said plates and also directed toward said discs, said rows of commutator segments and said slip rings being coaxial with each other and with said discs; a plurality of first brushes respectively carried by said discs for rotation therewith and respectively engaging said slip rings; a plurality of second brushes respectively connected electrically with said first brushes and also carried by said discs for rotation therewith, respectively, said plurality of second brushes respectively engaging said rows of commutator segments for moving therealong during rotation of said discs; a plurality of electrical circuits respectively interconnecting the commutator segments of each row with the electromagnet which cooperates with the pawl which cooperates with the ratchet wheel fixed to the disc which carries the brush which engages the latter row of commutator segments, said circuits placing said plurality of electromagnet means in circuit with said brushes and slip rings as well as said commutator segments; and a plurality of manually operable selecting means cooperating with said plurality of circuits for selectively opening a selected one of the circuits cooperating with the commutator segments carried by said plates, so that when said second brushes respectively reach commutator segments of circuits which have been selectively opened by the operator the plurality of electromagnet means will become unenergized and the pawls will automatically stop the discs at angular positions corresponding to the circuits which have been selectively opened by the operator.

14. An indicator assembly comprising, in combination, a rotary drive shaft; a plurality of parallel plates respectively formed with openings through which said shafts extends and said plates being perpendicular to said shaft; a plurality of discs freely turnable on said shaft and respectively located between said plates, said discs respectively carrying at their peripheries indicating symbols; a plurality of friction clutch means fixed to said shaft for rotation therewith and respectively located also between said plates, said plurality of friction clutch means respectively cooperating with said discs for rotating the latter; a plurality of ratchet wheels respectively fixed to said discs; a plurality of pawls respectively cooperating with said ratchet wheels for preventing turning of said discs; a plurality of spring means respectively cooperating with said pawls for urging the same into engagement with said ratchet wheels, said ratchet wheels respectively having teeth which respectively correspond to the symbols carried by said discs; a plurality of electromagnet means respectively cooperating with said pawls for moving the same, when said plurality of electromagnet means are energized, away from said ratchet wheels to release said discs for rotation with said friction clutch means; a plurality of slip rings respectively carried by said plates and directed toward said discs, respectively; a plurality of rows of commutator segments respectively carried by said plates and also directed toward said discs, said rows of commutator segments and said slip rings being coaxial with each other and with said discs; a plurality of first brushes respectively carried by said discs for rotation therewith and respectively engaging said slip rings; a plurality of second brushes respectively connected electrically with said first brushes and also carried by said discs for rotation therewith, respectively, said plurality of second brushes respectively engaging said rows of commutator segments for moving therealong during rotation of said discs; a plurality of electrical circuits respectively interconnecting the commutator segments of each row with the electromagnet which cooperates with the pawl which cooperates with the ratchet wheel fixed to the disc which carries the brush which engages the latter row of commutator segments, said circuits placing said plurality of electromagnet means in circuit with said brushes and slip rings as well as said commutator segments; and a plurality of manually operable selecting means cooperating with said plurality of circuits for selectively opening a selected one of the circuits cooperating with the commutator segments carried by said plates, so that when said second brushes respectively reach commutator segments of circuits which have been selectively opened by the operator the plurality of electromagnet means will become unenergized and the pawls will automatically stop the discs at angular positions corresponding to the circuits which have been selectively opened by the operator, said slip rings and commutator segments as well as parts of said circuits being in the form of printed circuits respectively carried by said plates.

15. An indicator assembly comprising, in combination, a rotary drive shaft; a plurality of parallel plates respectively formed with openings through which said shaft extends and said plates being perpendicular to said shaft; a plurality of discs freely turnable on said shaft and respectively located between said plates, said discs respectively carrying at their peripheries indicating symbols; a plurality of friction clutch means fixed to said shaft for rotation therewith and respectively located also between said plates, said plurality of friction clutch means respectively cooperating with said discs for rotating the latter; a plurality of ratchet wheels respectively fixed to said discs; a plurality of pawls respectively cooperating with said ratchet wheels for preventing turning of said discs; a plurality of spring means respectively cooperating with said pawls for urging the same into engagement with said ratchet wheels, said ratchet wheels respectively having teeth which respectively correspond to the symbols carried by said discs; a plurality of electromagnet means respectively cooperating with said pawls for moving the same, when said plurality of electromagnet means are energized, away from said ratchet wheels to release said discs for rotation with said friction clutch means; a plurality of slip rings respectively carried by said plates and directed toward said discs, respectively; a plurality of rows of commutator segments respectively carried by said plates and also directed toward said discs, said rows of commutator segments and said slip rings being coaxial with each other and with said discs; a plurality of first brushes respectively carried by said discs for rotation therewith and respectively engaging said slip rings; a plurality of second brushes respectively connected electrically with said first brushes and also carried by said discs for rotation therewith, respectively, said plurality of second brushes respectively engaging said rows of commutator segments for moving therealong during rotation of said discs; a plurality of electrical circuits respectively interconnecting the commutator segments of each row with the electromagnet which cooperates with the pawl which cooperates with the ratchet wheel fixed to the disc which carries the brush which engages the latter row of commutator segments, said circuits placing said plurality of electromagnet means in circuit with said brushes and slip rings as well as said commutator segments; and a plurality of manually operable selecting means cooperating with said plurality of circuits for selectively opening a selected one of the circuits cooperating with the commutator segments carried by said plates, so that when said second brushes respectively reach commutator segments of circuits which have been selectively opened by the operator the plurality of electromagnet means will become unenergized and the pawls will automatically stop the discs at angular positions corresponding to the circuits which have been selectively opened by the operator, said plurality of manually operable selecting means including a plurality of switches respectively located said circuits and a plurality of manually operable key means respectively cooperating with said switches for selectively moving the same to positions which will open selected circuits.

16. An indicator assembly comprising, in combination, a rotary drive shaft; a plurality of parallel plates respectively formed with openings through which said shaft extends and said plates being perpendicular to said shaft; a plurality of discs freely turnable on said shaft and respectively located between said plate, said discs respectively carrying at their peripheries indicating symbols; a plurality of friction clutch means fixed to said shaft for rotation therewith and respectively located also between said plates, said plurality of friction clutch means respectively cooperating with said discs for rotating the latter; a plurality of ratchet wheels respectively fixed to said discs; a plurality of pawls respectively cooperating with said ratchet wheels for preventing turning of said discs; a plurality of spring means respectively cooperating with said pawls for urging the same into engagement with said ratchet wheels, said ratchet wheels respectively having teeth which respectively correspond to the symbols carried by said discs; a plurality of electromagnet means respectively cooperating with said pawls for moving the same, when said plurality of electromagnet means are energized, away from said ratchet wheels to release said discs for rotation with said friction clutch means; a plurality of slip rings respectively carried by said plates and directed toward said discs, respectively; a plurality of rows of commutator segments respectively carried by said plates and also directed toward said discs, said rows of commutator segments and said slip rings being coaxial with each other and with said discs; a plurality of first brushes respectively carried by said discs for rotation therewith and respectively engaging said slip rings; a plurality of second brushes respectively connected electrically with said first brushes and also carried by said discs for rotation therewith, respectively, said plurality of second brushes respectively engaging said rows of commutator segments for moving therealong during rotation of said discs; a plurality of electrical circuits respectively interconnecting the commutator segments of each row with the electromagnet which cooperates with the pawl which cooperates with the ratchet wheel fixed to the disc which carries the brush which engages the latter row of commutator segments, said circuits placing said plurality of electromagnet means in circuit with said brushes and slip rings as well as said commutator segments; and a plurality of manually operable selecting means cooperating with said plurality of circuits for selectively opening a selected one of the circuits cooperating with the commutator segments carried by said plates, so that when said second brushes respectively reach commutator segments of circuits which have been selectively opened by the operator the plurality of electromagnet means will become unenergized and the pawls will automatically stop the discs at angular positions corresponding to the circuits which have been selectively opened by the operator, said circuits including for each row of commutator segments a circular row of electrical contacts respectively connected electrically with said segments and said selecting means including a manually turnable ring having at its periphery a notch which in different angular positions of said ring will be aligned with a selected one of said contacts so that all of the circuits will be closed except that which includes the contact which is aligned with said notch.

17. An indicator assembly as recited in claim 13 and wherein a single support member carries all of said electromagnet means.

18. An indicator assembly as recited in claim 13 and wherein at least one rod extends through all of said plates; and a plurality of spacer members carried by said rod and located between said plates for determining the space therebetween.

19. An indicator assembly as recited in claim 13 and wherein said selecting means includes a plurality of switch members in the circuits of each of said row of segments and a plurality of contacts respectively engaged by said switch members in one of the positions thereof, said latter contacts being respectively connected to all except one of said segments of said row, a plurality of second contacts respectively cooperating with each of said switch members and all connected electrically with each other and with said one segment, the selected switch which opens a selected one of said circuits engaging the second one of the contacts which cooperates therewith.

20. An indicator assembly as recited in claim 13 and wherein said selecting means includes a plurality of switch members in the circuits of each of said row of segments and a plurality of contacts respectively engaged by said switch members in one of the positions thereof, said latter contacts being respectively connected to all except one of said segments of said row, a plurality of second contacts respectively cooperating with each of said switch members and all connected electrically with each other and with said one segment, the selected switch which opens a selected one of said circuits engaging the second one of the contacts which cooperates therewith, all of said switch members being connected electrically with each other.

21. An indicating assembly comprising, in combination, a carrier; a plurality of indicating symbols carried by said carrier; electrical drive means operatively connected to said carrier for moving the same to a position where a selected one of said symbols will give an indication; electromagnetic control means cooperating with said carrier for stopping the movement thereof by said electrical drive means; a plurality of electrical circuits respectively corresponding to said symbols and respectively cooperating with said electromagnetic control means for maintaining the latter energized as long as said plurality of circuits are closed; means carried by said carrier and moving therewith for maintaining said circuits closed during movement of said carrier; manually operable selecting means for opening the selected one of said circuits, said means which is carried by said carrier upon reaching said selected circuit deenergizing said electromagnetic control means and stopping the movement of said carrier; and relay means connected electrically with said circuits and with said drive means for energizing the latter and maintaining said drive means energized until the selected one of said circuits is reached by said means carried by said carrier means so that said drive means also stops operating when said carrier has reached a position determined by the selection of one of said circuits.

22. An indicating assembly as recited in claim 21, printing means for printing the selected symbol; and electrical means cooperating with said printing means for actuating the same.

23. An indicating assembly as recited in claim 22, said relay means cooperating with said electrical means for preventing energizing thereof while said drive means is energized.

24. An indicating assembly as recited in claim 21, in combination, a plurality of said carriers and and electromagnetic control means, said relay means being connected in parallel to said plurality of said electromagnetic means whereby rectifier means are provided between each of said electromagnetic means and said relay means.

25. In a photographic device, in combination, at least one operable selecting means for providing for the operator a selection of one of several adjusting values and stamping means for automatically stamping the selected adjusting values on a recording material, said stamping means including at least one carrier carrying stamping symbols which respectively correspond to said adjusting values, support means for movably supporting said carrier, electrical means actuated by operation of said operable selecting means and cooperating with said carrier for moving the same to a position where the stamping symbol corresponding to the selected adjusting value is adapted to be stamped on said recording material, and exposure-adjusting means operatively connected to said selecting means to be actuated thereby for adjusting the extent to which a light-sensitive material is exposed in accordance with the selection made upon actuation of said selecting means.

26. In a machine for providing photographic reproductions, in combination, at least one manually operable selecting means for providing for the operator a selection of one of several exposure-determining values; a first means constituted by at least one carrier carrying marking symbols which respectively correspond to said values; support means supporting said carrier for movement to a plurality of positions where said plurality of symbols will respectively indicate the selected value; means actuated by operation of said manually operable selecting means and cooperating with said carrier for automatically moving the same to a position where the indicating symbol corresponds to the value selected at said manually operable selecting means; a second means supporting a photographic sheet with its reverse side directed toward said carrier so that the marking symbol corresponding to the selected value will be directed toward said reverse side of said recording sheet; moving means located adjacent one of said first and second means for moving said one means toward the other of said first and second means so that the marking symbol corresponding to the selected value will be recorded on the reverse side of said photographic sheet; and means operatively connected to said moving means for preventing the latter from displacing said one means toward said other means until after said carrier has reached said position where the indicating symbol thereof corresponds to the selected value.

27. An indicating assembly comprising, in combination, a rotary shaft; drive means operatively connected to said shaft for rotating the same; a plurality of discs freely turnable on said shaft and each carrying a plurality of indicating symbols; a plurality of friction clutch means fixed to said shaft for rotation therewith and respectively engaging said discs for rotating the latter with said shaft; a plurality of electrically-actuated stop means respectively cooperating with said discs for holding the latter stationary while said shaft and friction clutch means continue to rotate; a plurality of electrically conductive segments located adjacent each disc along a circle which surrounds said shaft and the number of said segments corresponding to the number of symbols on each disc; an electrically conductive slide contact carried by each disc and engaging said row of segments for movement therealong during rotation of each disc with the friction clutch means engaging the same; a plurality of switches equal in number to the number of segments located adjacent each disc and electrically connected therewith, said switches being adapted to be selectively actuated by the operator and being connected to a common source of potential, and said electrically actuated stop means being located in the electrical circuit of and electrically connected with said slide contact and switches.

28. An assembly as recited in claim 27 and wherein the number of electrically conductive segments exceed by one the number of said symbols and said switches being equal to the number of said symbols and each including a movable switch member and a pair of switch contacts cooperating therewith, one of said contacts of said switches respectively being electrically connected with said segments which respectively correspond to said symbols and the other of said contacts of said switches all being connected to said one segment in excess of those which correspond to said symbols.

29. An assembly as recited in claim 27 and wherein said switches are connected into said circuit and are manually operable.

30. An assembly as recited in claim 27 and wherein said switches include a plurality of stationary contacts, respectively, arranged along a circle, and a manually turnable electrically conductive ring formed with a notch which in a selected angular position of said ring is aligned with one of said contacts so that the switch which includes said one contact will be open, whereby all of the switches except that one which includes a contact aligned with said notch are closed.

31. An assembly as recited in claim 27 and wherein an electrically non-conductive plate is located adjacent each disc and carries said segments, said plates being arranged in a row, and a plurality of supporting shafts extending through said plates and carrying spacers for maintaining said plates at predetermined distances from each other, said assembly including a housing which carries said plurality of shafts which extend through said plates and in which said plates are situated so as to define between themselves separate compartments each of which accommodates a disc and a friction clutch means cooperating therewith as well as a stop means cooperating with said disc.

32. An assembly as recited in claim 27 and wherein said drive means is an electric motor, and relay means connected in parallel with said plurality of electrically-actuated stop means and cooperating with said motor for starting the same when the operator actuates a switch different from that corresponding to a symbol which is in a predetermined position and for stopping the motor when the newly-selected symbol corresponding to the newly-actuated switch reaches said predetermined position.

References Cited by the Examiner

UNITED STATES PATENTS

| 1,821,466 | 9/31 | Grass | 95—4.5 |
|---|---|---|---|
| 2,226,364 | 12/40 | Anthony | 95—1.1 |
| 2,490,338 | 12/49 | Martin et al. | 95—1.1 |
| 2,543,353 | 2/51 | Champion | 95—1.1 |
| 2,721,507 | 10/55 | Siok | 95—73 |
| 2,773,436 | 12/56 | Martin | 95—1.1 |
| 2,817,428 | 12/57 | Appelberg | 197—12 |
| 2,943,542 | 7/60 | Bloomfield | 95—1.1 |

EVON C. BLUNK, *Primary Examiner.*